US010000138B2

(12) United States Patent
Tanaka (10) Patent No.: US 10,000,138 B2
(45) Date of Patent: Jun. 19, 2018

(54) COOLING DEVICE OF ONBOARD SECONDARY BATTERY

(71) Applicant: FUJI JUKOGYO KABUSHIKI KAISHA, Tokyo (JP)

(72) Inventor: Hisashi Tanaka, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days. days.

(21) Appl. No.: 15/171,932

(22) Filed: Jun. 2, 2016

(65) Prior Publication Data

US 2016/0362018 A1 Dec. 15, 2016

(30) Foreign Application Priority Data

Jun. 12, 2015 (JP) ................. 2015-119422

(51) Int. Cl.
*B60K 11/00* (2006.01)
*B60L 11/18* (2006.01)
(Continued)

(52) U.S. Cl.
CPC ............ *B60L 11/1874* (2013.01); *B60K 1/04* (2013.01); *B60K 6/28* (2013.01); *B60L 11/1816* (2013.01);
(Continued)

(58) Field of Classification Search
CPC .......... B60K 11/06; B60K 11/00; B60K 1/04; B60K 6/28; B60K 2001/0416;
(Continued)

(56) References Cited

U.S. PATENT DOCUMENTS 5,490,572 A * 2/1996 Tajiri ................. B60H 1/00278
180/65.1
6,094,927 A * 8/2000 Anazawa ........... B60H 1/00278
62/239

(Continued)

FOREIGN PATENT DOCUMENTS

JP 09-232007 A 9/1997
JP 10-201124 A 7/1998
(Continued)

OTHER PUBLICATIONS

Office Action received for Japanese Patent application No. 2015-119422, dated Dec. 21, 2016, 3 pages of Office Action including 4 pages of English translation.
(Continued)

*Primary Examiner* — James M Dolak
(74) *Attorney, Agent, or Firm* — Chip Law Group (57) ABSTRACT

A cooling device of an onboard secondary battery, includes a housing that is provided in a vehicle, and houses a battery pack including a secondary battery and a case that covers the secondary battery, a blower that blows an air at an outside of the vehicle into the housing, a temperature determiner that determines whether or not an air temperature of the outside of the vehicle is lower than a temperature of the secondary battery, and a blow controller that drives the blower, when the temperature determiner determines that the air temperature of the outside of the vehicle is lower than the temperature of the secondary battery.

20 Claims, 9 Drawing Sheets

(51) Int. Cl.
*H01M 10/613* (2014.01)
*H01M 10/625* (2014.01)
*H01M 10/6563* (2014.01)
*B60K 1/04* (2006.01)
*B60K 6/28* (2007.10)
*H01M 10/46* (2006.01)
*H01M 10/48* (2006.01)
*B60K 1/00* (2006.01)

(52) U.S. Cl.
CPC ......... *H01M 10/46* (2013.01); *H01M 10/486* (2013.01); *H01M 10/613* (2015.04); *H01M 10/625* (2015.04); *H01M 10/6563* (2015.04); *B60K 2001/005* (2013.01); *B60K 2001/0416* (2013.01); *H01M 2220/20* (2013.01); *Y10S 903/907* (2013.01)

(58) Field of Classification Search
CPC . B60L 11/1874; B60L 11/187; H01M 10/613; H01M 10/486; H01M 10/46; H01M 10/6563; H01M 10/625; H01M 10/635; H01M 10/65; H01M 10/61
See application file for complete search history.

(56) References Cited

U.S. PATENT DOCUMENTS

| | | | | |
|---|---|---|---|---|
| 6,457,542 B1* | 10/2002 | Hosono | ............... | B60K 6/22 180/68.1 |
| 6,750,630 B2* | 6/2004 | Inoue | ............ | B60H 1/00278 320/104 |
| 7,025,159 B2* | 4/2006 | Smith | ............ | B60H 1/00278 180/68.1 |
| 7,152,417 B2* | 12/2006 | Morishita | ......... | B60H 1/00278 62/186 |
| 7,500,512 B2* | 3/2009 | Hasegawa | ......... | H05K 7/20909 165/41 |
| 7,735,331 B2* | 6/2010 | Zhu | ............... | B60H 1/00278 236/49.3 |
| 8,241,097 B2* | 8/2012 | Zhu | ............... | B60H 1/00278 454/139 |
| 8,251,169 B2* | 8/2012 | Fujiwara | ............ | H01M 2/1077 180/68.1 |
| 8,511,237 B2* | 8/2013 | Morita | ............... | B60K 1/04 105/51 |
| 8,602,091 B2* | 12/2013 | Nemoto | ............ | B60H 1/00278 165/202 |
| 8,720,344 B2* | 5/2014 | Kumar | ............... | B60L 11/1874 105/49 |
| 8,950,533 B2* | 2/2015 | Nemesh | ............ | B60L 11/1812 165/72 |
| 9,656,532 B2* | 5/2017 | Blackburn | ......... | B60H 1/00271 |
| 9,722,286 B2* | 8/2017 | Smith | ............... | H01M 10/613 |
| 9,731,622 B2* | 8/2017 | Rawlinson | ......... | B60L 11/1874 |
| 9,731,667 B2* | 8/2017 | Takaoka | ............... | B60R 16/033 |
| 9,738,176 B2* | 8/2017 | Garfinkel | ............ | B60L 11/1874 |
| 9,742,043 B2* | 8/2017 | Tanigaki | ............ | H01M 10/625 |
| 9,785,156 B2* | 10/2017 | Sato | ........................ | B60R 16/02 |
| 9,786,967 B2* | 10/2017 | Smith | ............... | H01M 10/633 |
| 9,787,109 B2* | 10/2017 | Smith | ............... | H02J 7/0021 |
| 9,812,744 B2* | 11/2017 | Yamamoto | ......... | H01M 10/6563 |
| 9,819,061 B2* | 11/2017 | Reitzle | ............... | H01M 10/486 |
| 9,827,846 B2* | 11/2017 | Porras | ............... | B60K 11/085 |
| 9,840,137 B2* | 12/2017 | Kusumi | ............... | B60K 1/04 |
| 9,844,995 B2* | 12/2017 | Rawlinson | ......... | B60H 1/00278 |
| 9,853,296 B2* | 12/2017 | Hirsch | ............... | H01M 6/5038 |
| 2007/0072061 A1* | 3/2007 | Shimizu | ............... | H01M 2/1077 429/62 |

FOREIGN PATENT DOCUMENTS

| | | |
|---|---|---|
| JP | 2002-063946 A | 2/2002 |
| JP | 2002-219949 A | 8/2002 |
| JP | 2002-231321 A | 8/2002 |
| JP | 2007-314139 A | 12/2007 |
| JP | 2010-161904 A | 7/2010 |
| JP | 2011-258426 A | 12/2011 |
| JP | 2013-151242 A | 8/2013 |
| JP | 2015-095985 A | 5/2015 |
| WO | 2010-032312 A1 | 3/2010 |

OTHER PUBLICATIONS

Office Action received for Japanese Patent application No. 2015-119422, dated May 9, 2017, 3 pages of office action and 4 pages of English translation.
Office Action received for Japanese Patent application No. 2015-119422, dated Dec. 5, 2017, 03 pages of office action and 03 pages of English translation.

\* cited by examiner

COOLING DEVICE OF ONBOARD SECONDARY BATTERY

CROSS-REFERENCE TO RELATED APPLICATIONS

The present application claims priority from Japanese Patent Application No. 2015-119422 filed on Jun. 12, 2015, the entire contents of which are hereby incorporated by reference.

BACKGROUND

1. Technical Field

The present invention relates to a cooling device of an onboard secondary battery.

2. Related Art

In recent years, there is known an electric vehicle (EV) and a hybrid electric vehicle (HEV) including a driving motor that outputs driving force of a vehicle and a secondary battery that supplies electricity to the driving motor. A secondary battery provided in such a vehicle is characterized in that the secondary battery tends to degrade as its battery temperature increases. Thus, in order to prevent the secondary battery from degradation, a technology for cooling the secondary battery is proposed.

For example, in Japanese Unexamined Patent Application Publication (JP-A) No. 2007-314139, a technology is disclosed which takes vehicle compartment air cooled by a cooling mechanism or the like into a space where a secondary battery is disposed, in order to cool the secondary battery.

Here, in the entire life of a vehicle, a parking time is far longer than a traveling time, and therefore the influence of a battery temperature in the parking time on degradation of a secondary battery is larger than the influence of a battery temperature in the traveling time of the vehicle. Thus, it is expected that the degradation of the secondary battery be reduced by reducing a temperature rise of the secondary battery at the time of parking. However, in the technology relevant to cooling of the onboard secondary battery of the past, it is sometimes difficult to reduce the degradation of the secondary battery at the time of parking.

In general, the vehicle compartment air is cooled by a cooling mechanism or the like, while driving the vehicle, in order to improve comfort of a driver. Thus, the cooling mechanism stops while the vehicle is parked, and therefore the temperature in the vehicle compartment can be high under direct sunlight in summer season. Thus, for example, in the technology disclosed in JP-A No. 2007-314139, the temperature of the vehicle compartment air can be high, and therefore it is sometimes difficult to cool the secondary battery, even if the vehicle compartment air is taken into the space where the secondary battery is disposed, while the vehicle is parked.

SUMMARY OF THE INVENTION

It is desirable to provide a new and improved cooling device of an onboard secondary battery, which is capable of reducing the degradation of the secondary battery.

An aspect of the present invention provides a cooling device of an onboard secondary battery, including: a housing that is provided in a vehicle, and houses a battery pack including a secondary battery and a case that covers the secondary battery; a blower that blows an air at an outside of the vehicle into the housing; a temperature determiner that determines whether or not an air temperature of the outside of the vehicle is lower than a temperature of the secondary battery; and a blow controller that drives the blower, when the temperature determiner determines that the air temperature of the outside of the vehicle is lower than the temperature of the secondary battery.

The blow controller may control a driving of the blower, in a state in which the secondary battery is chargeable by a power supply outside the vehicle.

The secondary battery may be a high voltage electricity supply source. The blower may blow the air of the outside of the vehicle into the housing, by using an electricity of an electricity supply source of a lower voltage than the secondary battery. An electricity may be supplied from the secondary battery to the electricity supply source of the lower voltage than the secondary battery, in a state in which the blower is driven.

The blow controller may drive the blower, when the temperature determiner determines that the air temperature of the outside of the vehicle is lower than the temperature of the secondary battery and that the temperature of the secondary battery is higher than a first temperature.

The blow controller may stop a driving of the blower, after the blower blows the air of the outside of the vehicle into the housing continuously for a first time.

The cooling device may further include: a charge controller that controls a charging of the secondary battery. The charge controller may start the charging of the secondary battery, after a second time elapses from a time point at which the secondary battery becomes chargeable by the power supply outside the vehicle.

The cooling device may further include: a charge controller that controls a charging of the secondary battery. The charge controller may start the charging of the secondary battery, when the temperature of the secondary battery is lower than a second temperature.

Of components of the housing, a component that may be positioned at a vehicle compartment side of the vehicle has a heat insulation property.

According to the present invention, the degradation of the secondary battery can be prevented, as described above.

DETAILED DESCRIPTION

Hereinafter, preferred implementations of the present invention will be described in detail with reference to the appended drawings. Note that, in this specification and the appended drawings, structural elements that have substantially the same function and structure are denoted with the same reference numerals, and repeated description of these structural elements is omitted.

1. System Which Can Employ Cooling Device According to Present Implementation First, with reference to FIG. 1, a system that can employ a cooling device according to the present implementation will be described.

Figure 1:
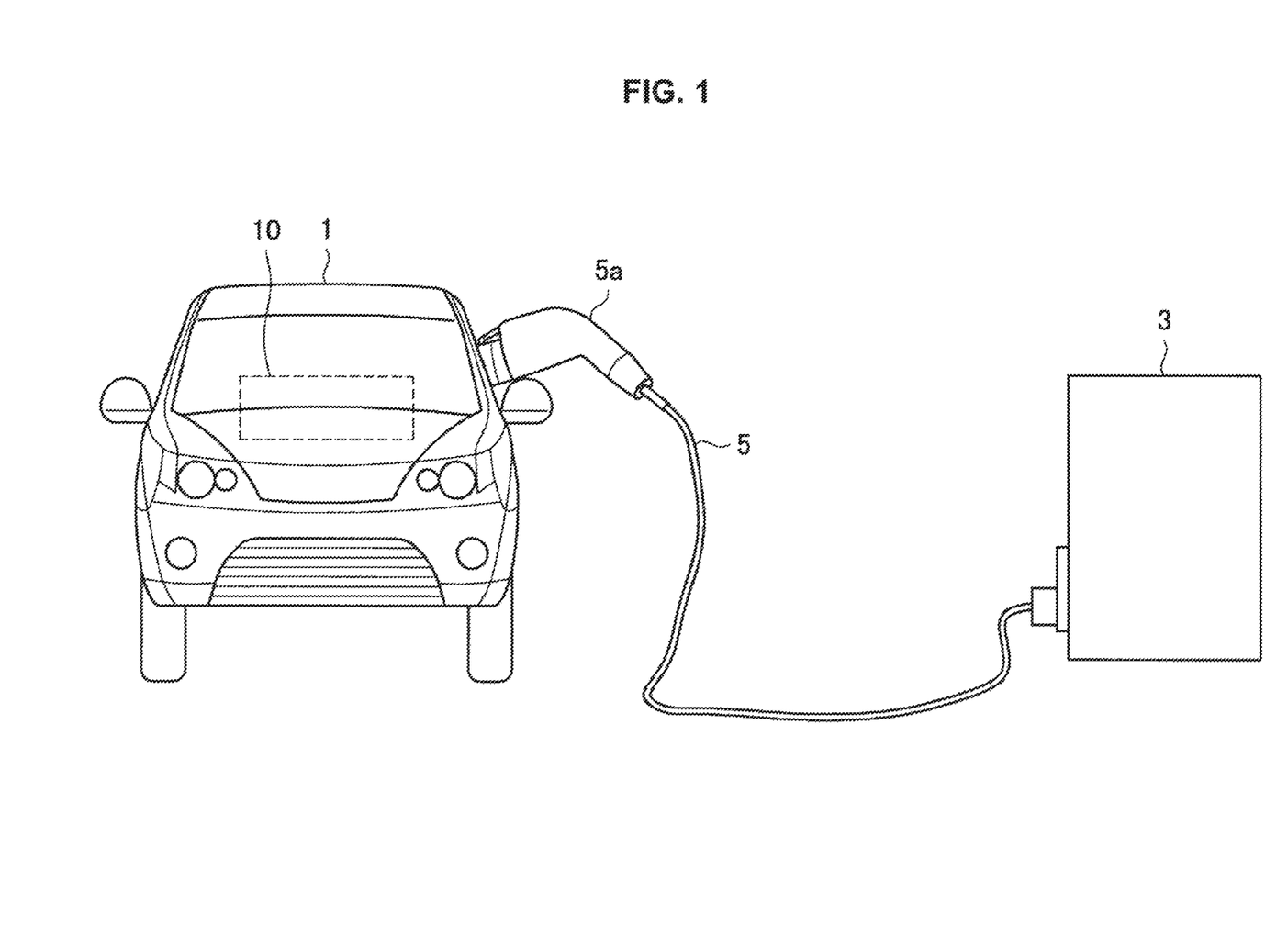
FIG. 1 illustrates a schematic configuration of an example of a system that can employ a cooling device according to an implementation of the present invention.

FIG. 1 illustrates a schematic configuration of an example of the system that can employ the cooling device according to the present implementation. The system illustrated in FIG. 1 includes a vehicle 1, an external charge device 3, and a cable 5.

The vehicle 1 is an electric vehicle (EV) or a hybrid electric vehicle (HEV) including a driving motor that outputs driving force of the vehicle 1 and a secondary battery that supplies electricity to the a driving motor. A cooling device 10 according to the present implementation is provided in the vehicle 1. The cooling device 10 takes the air outside the vehicle 1 into an inner area of the vehicle 1, in order to cool the secondary battery provided in the vehicle 1. Specifically, in the present implementation, a battery pack includes the secondary battery and a case that covers the secondary battery, and a housing that houses the battery pack is provided in the vehicle 1. The cooling device 10 blows the air outside the vehicle 1 into the space between the inner surface of the housing and the outer surface of the battery pack. Thereby, the secondary battery can be cooled by utilizing the external air, even when the temperature of the vehicle compartment air becomes high during parking of the vehicle 1. Thus, the degradation of the secondary battery can be prevented. Note that the detail of the cooling device 10 will be described later.

The external charge device 3 is a charge device outside the vehicle 1, which is installed in a home, a commercial facility, or the like, and is coupled to an external power supply. The external charge device 3 supplies electricity to the vehicle 1 that is parked at a predetermined parking position via the cable 5. One end of the cable 5 is coupled to the external charge device 3, and at the other end a plug 5a is provided to be coupled to the vehicle 1 in an attachable and detachable manner. The plug 5a of the cable 5 is coupled to the vehicle 1, so that electricity can be supplied from the external charge device 3 via the cable 5 to the vehicle 1, and the secondary battery provided in the vehicle 1 becomes chargeable by the power supply outside the vehicle 1. The state in which the vehicle 1 is coupled to the plug 5a of the cable 5 as illustrated in FIG. 1 is referred to as plug-in state. The electricity supplied from the external charge device 3 to the vehicle 1 is used to charge the secondary battery, and is used as a power source of the cooling device 10 of the vehicle 1.

2. Cooling Device According to Present Implementation

2-1. Schematic Configuration of Cooling Device

Next, a schematic configuration of an example of the cooling device 10 according to the present implementation will be described, with reference to FIG. 2.

Figure 2:
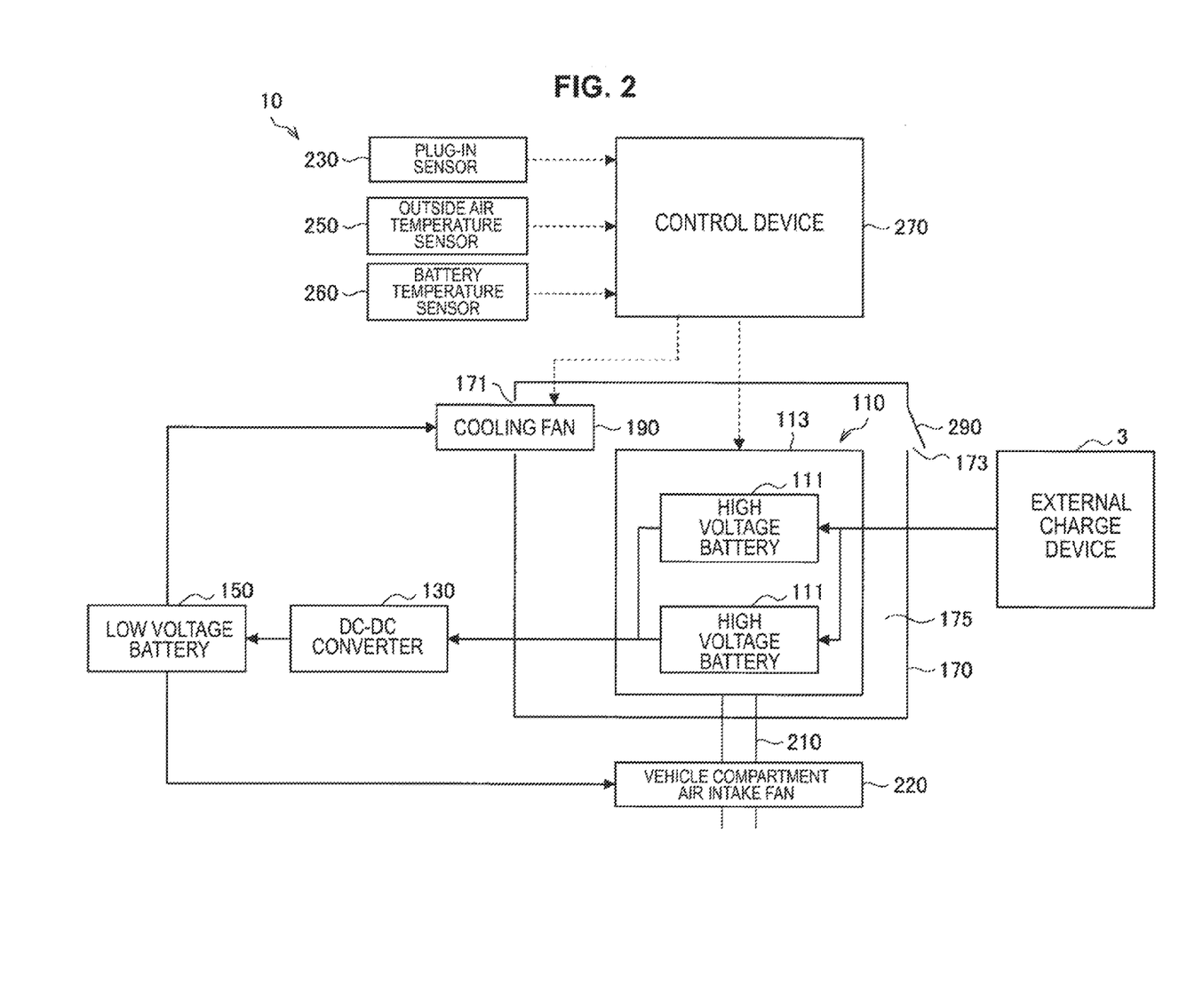
FIG. 2 illustrates a schematic configuration of an example of a cooling device according to the same implementation.

FIG. 2 illustrates the schematic configuration of the example of the cooling device 10 according to the present implementation. As illustrated in FIG. 2, the cooling device 10 includes a battery pack 110, a DC-DC converter 130, a low voltage battery 150, a housing 170, a cooling fan 190, a vehicle compartment air intake duct 210, a vehicle compartment air intake fan 220, a plug-in sensor 230, an outside air temperature sensor 250, a battery temperature sensor 260, and a control device 270.

The battery pack 110 includes a high voltage battery 111 provided in the vehicle 1, and a case 113 that covers the high voltage battery 111.

The high voltage battery 111 is an example of the secondary battery according to an implementation of the present invention. The high voltage battery 111 is an electricity supply source of a high voltage (for example, 200V). Specifically, the high voltage battery 111 supplies electricity to the driving motor that outputs the driving force of the vehicle 1, and supplies electricity to the low voltage battery 150 via the DC-DC converter 130. A lithium ion battery is used as the high voltage battery 111, for example. The high voltage battery 111 can be charged by using the electricity supplied from the external charge device 3, at the time of parking of the vehicle 1. Also, the high voltage battery 111 can be charged by using the electricity obtained by a regenerative function of the driving motor that converts deceleration energy to electricity, at the time of driving of the vehicle 1. The high voltage battery 111 includes one or a plurality of battery cells.

The case 113 is a component made of metal such as iron and aluminium, which covers the high voltage battery 111. The case 113 is coupled to a vehicle compartment air intake duct 210 for taking the vehicle compartment air of the vehicle 1 into the inner area of the case 113.

The DC-DC converter 130 reduces the voltage of the electricity supplied from the high voltage battery 111. Specifically, the DC-DC converter 130 reduces the voltage of the electricity supplied from the high voltage battery 111 from 200V to 12V. The electricity whose voltage is reduced by the DC-DC converter 130 is supplied to the low voltage battery 150.

The low voltage battery 150 is an electricity supply source of a lower voltage (for example, 12V) than the high voltage battery 111. Specifically, the low voltage battery 150 supplies electricity to various types of devices in the vehicle 1, such as the cooling fan 190 and the vehicle compartment air intake fan 220. The low voltage battery 150 is charged by using the electricity supplied from the high voltage battery 111 via the DC-DC converter 130.

The vehicle compartment air intake duct 210 is a pipe arrangement provided to take the vehicle compartment air of the vehicle 1 into the inner area of the case 113 of the battery pack 110. The vehicle compartment air intake duct 210 communicates between the vehicle compartment of the vehicle 1 and the inner area of the case 113.

The vehicle compartment air intake fan 220 is a blowing fan provided to cool the high voltage battery 111, at the time of driving of the vehicle 1. The vehicle compartment air intake fan 220 takes the vehicle compartment air of the vehicle 1 into the inner area of the case 113 of the battery pack 110 through the vehicle compartment air intake duct 210, and is provided in the inner area of the vehicle compartment air intake duct 210, for example. For example, the vehicle compartment air intake fan 220 is coupled to an electrical driving motor (not depicted), and is driven by the electrical driving motor by using the electricity supplied from the low voltage battery 150 as the power source. In general, the vehicle compartment air is cooled by a cooling mechanism or the like (not depicted), in order to improve comfort of a driver, at the time of driving of the vehicle 1. Thus, at the time of driving of the vehicle 1, the air cooled in the vehicle compartment of the vehicle 1 can be taken into the inner area of the case 113, by driving the vehicle compartment air intake fan 220.

The housing 170 houses the battery pack 110, and is provided in the vehicle 1. In the housing 170, a first opening 171 and a second opening 173 that communicates between the outside of the vehicle 1 and the inner area of the housing 170 is provided. In the first opening 171, a cooling fan 190 that blows the air outside the vehicle 1 to a ventilation space 175 between the inner surface of the housing 170 and the outer surface of the battery pack 110 is provided. Also, in the second opening 173, a valve 290 that can open and close the second opening 173 is provided. When the pressure of the inner area of the housing 170 has exceeded a predetermined pressure, the valve 290 opens the second opening 173. For example, quarter ventilation may be utilized as the second opening 173 and the valve 290. The air outside the vehicle 1 is blown to the ventilation space 175 by the cooling fan 190, and is released to the outside of the vehicle 1 through the second opening 173 opened by the valve 290. Thereby, the air outside the vehicle 1 is supplied to the ventilation space 175, so that the ventilation space 175 can be ventilated by the air outside the vehicle 1. Note that the detail of the configuration of the housing 170 and around the housing 170 will be described later.

The cooling fan 190 is an example of the blower according to the implementation of the present invention. The cooling fan 190 is a blowing fan provided to cool the high voltage battery 111 at the time of parking of the vehicle 1. The cooling fan 190 blows the air outside the vehicle 1 into the housing 170. Specifically, the cooling fan 190 is provided in the first opening 171 of the housing 170, and blows the air outside the vehicle 1 to the ventilation space 175 of the housing 170 through the first opening 171.

Electricity is supplied from the high voltage battery 111 to the low voltage battery 150, in the state in which the cooling fan 190 is driven. For example, the cooling fan 190 is coupled to the electrical driving motor (not depicted), and is driven by the electrical driving motor by using the electricity supplied from the low voltage battery 150 as the power source. Thus, the air outside the vehicle 1 can be blown to the ventilation space 175, by driving the cooling fan 190, at the time of parking of the vehicle 1. Thereby, the low voltage battery 150 can be charged at the time of driving of the cooling fan 190 in which the electricity accumulated in the low voltage battery 150 is consumed. Thus, the driving of the cooling fan 190 can be continued, without completely consuming the electricity accumulated in the low voltage battery 150.

The plug-in sensor 230 detects whether or not the vehicle 1 is coupled to the plug 5a of the cable 5 (plug-in state illustrated in FIG. 1), and outputs the detection result.

The outside air temperature sensor 250 detects the temperature of the air outside the vehicle 1, and outputs the detection result.

The battery temperature sensor 260 detects the temperature of the high voltage battery 111, and outputs the detection result. A plurality of battery temperature sensors 260 may be provided at the vicinity of the high voltage battery 111, in order to output the highest temperature among the detected temperatures as the detection result, for example.

The control device 270 controls the operation of each device that configures the cooling device 10. Specifically, the control device 270 performs an operation instruction by using an electrical signal to each control target actuator. More specifically, the control device 270 controls charging of the high voltage battery 111 and driving of the cooling fan 190. The control device 270 may control driving of the vehicle compartment air intake fan 220 at the time of driving of the vehicle 1. Also, the control device 270 receives the information output from each sensor, from the sensor. The control device 270 may perform communication with each sensor by using controller area network (CAN) communication.

Note that the function of the control device 270 may be divided into a plurality of control devices, and in that case the plurality of control devices may be coupled to each other via a communication bus such as CAN. The detail of the control device 270 will be described later.

2-2. Configuration of Housing and Around Housing

In the preceding section, the schematic configuration of an example of the cooling device 10 according to the present implementation has been described. Next, the configuration of the housing 170 and around the housing 170 according to the present implementation will be described, with reference to FIGS. 3 and 4.

Figure 3:
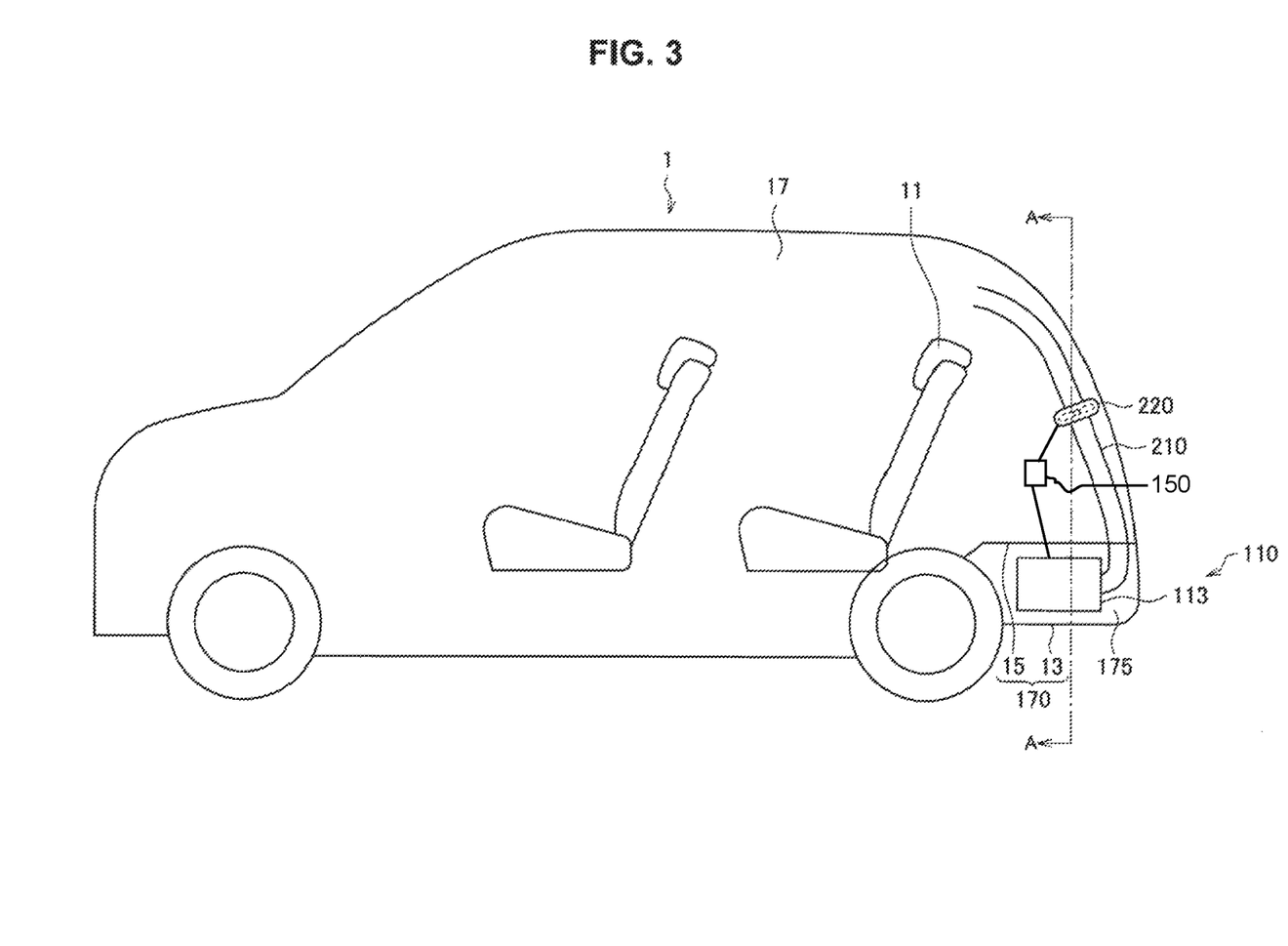
FIG. 3 illustrates an example of disposition of a housing in a vehicle.

FIG. 3 illustrates an example of disposition of the housing 170 in the vehicle 1. Here, the direction of movement of the vehicle 1 in FIG. 3 is defined as forward. As illustrated in FIG. 3, the housing 170 is provided in the rear lower portion of the vehicle 1, for example, and includes a rear part 13 of a floor pan and a luggage compartment deck board 15 which are more rearward than a rear seat 11. Also, the luggage compartment deck board 15 is a component that is positioned at the vehicle compartment 17 side of the vehicle 1 among the components that configure the housing 170, and may have a heat insulation property. This reduces the amount of heat that flows into the inner area of the housing 170 from the vehicle compartment 17 side. This reduces the rise of temperature of the high voltage battery 111 at the inner area of the housing 170 due to the heat that flows into the inner area of the housing 170 from the vehicle compartment 17 side, when the temperature of the air in the vehicle compartment 17 is high while the vehicle is parked.

Also, as illustrated in FIG. 3, the vehicle compartment air intake duct 210 extends upwardly from a part coupled to the battery pack 110, for example, and communicates between the vehicle compartment 17 and the inner area of the battery pack 110. The vehicle compartment air intake fan 220 provided in the inner area of the vehicle compartment air intake duct 210 is driven to take the air in the vehicle compartment 17 into the inner area of the case 113 of the battery pack 110 through the vehicle compartment air intake duct 210.

Figure 4:
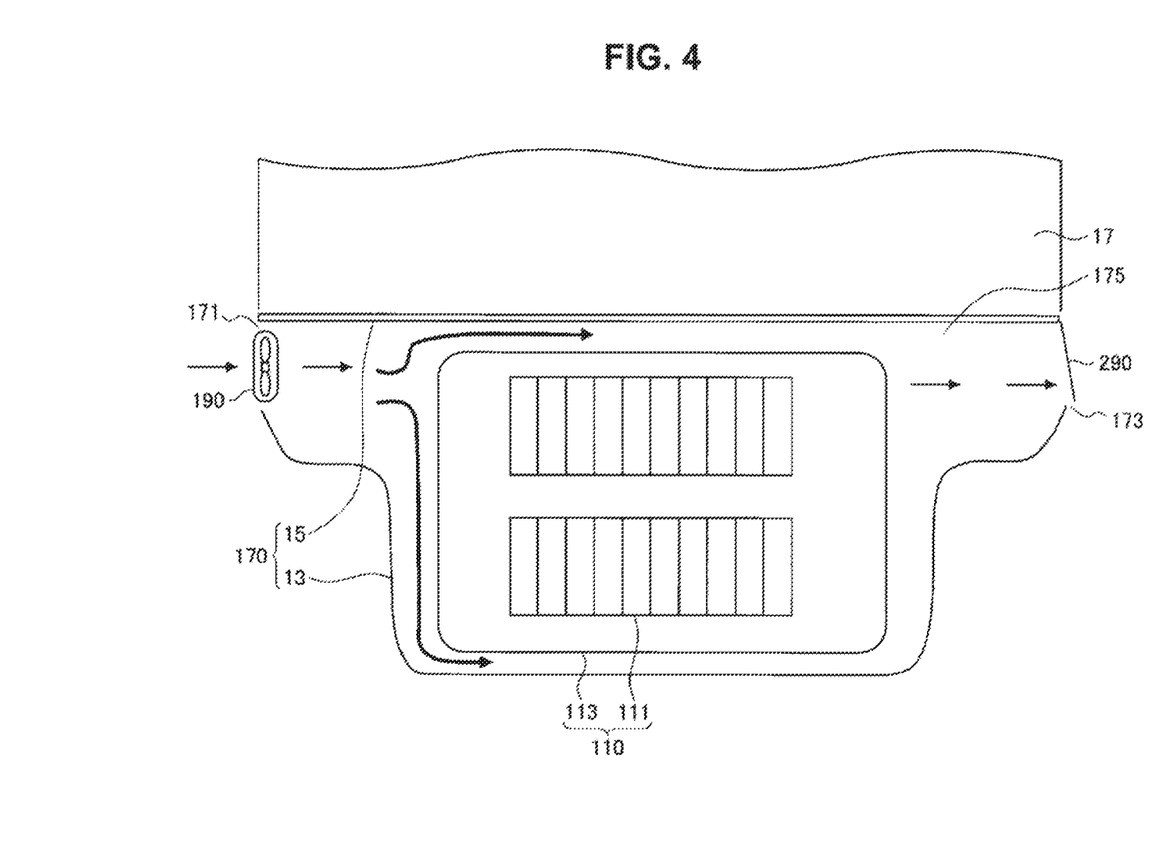
FIG. 4 is a cross-sectional view in a cross section of a configuration of a housing and around the housing illustrated in FIG. 3, which is substantially perpendicular to a front-back direction.

FIG. 4 is a cross-sectional view in A-A cross section of the configuration of the housing 170 and around the housing 170 illustrated in FIG. 3, which is substantially perpendicular to the front-back direction. In FIG. 4, solid line arrows indicate the flow of the air at the outside of the vehicle 1, which is supplied to the ventilation space 175 by the cooling fan 190.

As illustrated in FIG. 4, for example, a bottom face and a side face of the housing 170 is formed of the rear part 13 of the floor pan, and a top face of the housing 170 is formed of the luggage compartment deck board 15. Thereby, the battery pack 110 is covered by the rear part 13 of the floor pan and the luggage compartment deck board 15. The first opening 171 and the second opening 173 are provided on the left side surface and the right side surface of the rear part 13 of the floor pan, respectively.

The cooling fan 190 and the valve 290 is provided in the first opening 171 and the second opening 173, respectively. As illustrated with the solid line arrows in FIG. 4, the cooling fan 190 is driven at the time of parking of the vehicle 1, in order to blow the air outside the vehicle 1 to the ventilation space 175 between the inner surface of the housing 170 and the outer surface of the battery pack 110 through the first opening 171. When the pressure of the inner area of the housing 170 exceeds a predetermined pressure by the blowing to the ventilation space 175, the second opening 173 is opened by the valve 290, and the air outside the vehicle 1 which is blown to the ventilation space 175 is released to the outside of the vehicle 1 through the second opening 173. Thereby, the air outside the vehicle 1 is supplied to the ventilation space 175, and the ventilation space 175 is ventilated by the air outside the vehicle 1.

Note that the number and the disposition of the first opening 171 and the second opening 173 can be set as appropriate, according to the number, the shape, and the disposition of the battery pack 110. Also, the number of the high voltage battery 111 provided in the inner area of the case 113 is not limited to the example illustrated in FIG. 4, but may be another number. Also, in the inner surface side of the rear part 13 of the floor pan, an acoustic insulating member may be provided to improve quietness in the vehicle compartment 17. Also, although an example is described in the above in which the housing 170 is provided in the rear lower portion of the vehicle 1, the disposition of the housing 170 in the vehicle 1 is not limited to such an example, but for example the housing 170 may be provided more forward than the rear seat 11, and may be provided more upward than the luggage compartment deck board 15.

2-3. Function and Configuration of Control Device

In the preceding section, the configuration of the housing 170 and around the housing 170 according to the present implementation has been described. Next, the function and configuration of the control device 270 according to the present implementation will be described, with reference to FIG. 5.

Figure 5:
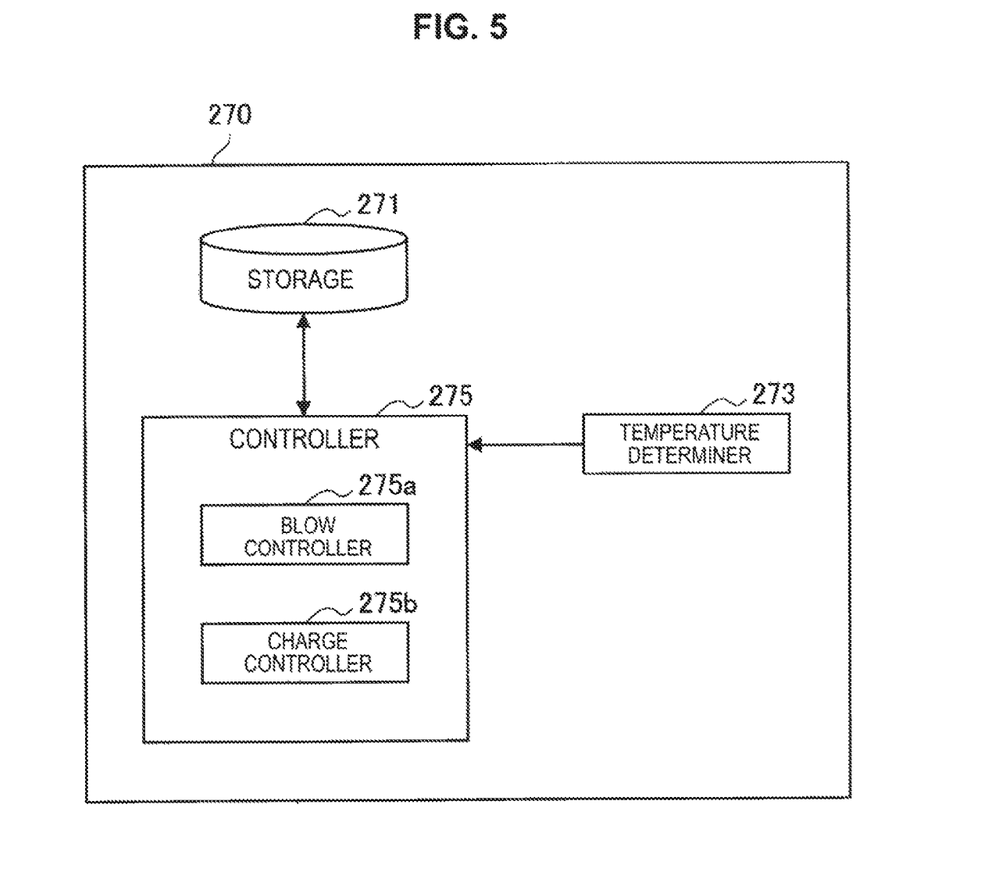
FIG. 5 illustrates an example of a function and configuration of a control device according to the same implementation.

FIG. 5 illustrates an example of the function and configuration of the control device 270 according to the present implementation. As illustrated in FIG. 5, the control device 270 includes a storage 271, a temperature determiner 273, and a controller 275.

(Storage)

The storage 271 stores information which is referred for the control by the control device 270. For example, the storage 271 stores various types of threshold values used in the determination process by the controller 275.

(Temperature Determiner)

The temperature determiner 273 determines whether or not the air temperature of the outside of the vehicle 1 is lower than the temperature of the high voltage battery 111, and outputs the determination result to the controller 275. Specifically, the temperature determiner 273 determines whether or not the air temperature of the outside of the vehicle 1 is lower than the temperature of the high voltage battery 111, on the basis of the information indicating the air temperature of the outside of the vehicle 1 output from the outside air temperature sensor 250 and the information indicating the temperature of the high voltage battery 111 output from the battery temperature sensor 260. The temperature determiner 273 may determine whether or not the air temperature of the outside of the vehicle 1 is lower than the temperature of the high voltage battery 111, when the vehicle 1 is in the plug-in state.

(Controller)

The controller 275 controls the overall operation of the cooling device 10, and includes a blow controller 275a and a charge controller 275b.

The blow controller 275a controls driving of the cooling fan 190. Specifically, the blow controller 275a drives the cooling fan 190, when the temperature determiner 273 determines that the air temperature of the outside of the vehicle 1 is lower than the temperature of the high voltage battery 111. Thereby, air of a lower temperature than the temperature of the high voltage battery 111 can be supplied from the outside of the vehicle 1 to the ventilation space 175. When the temperature of the air in the vehicle compartment 17 at the time of parking under the direct sunlight of the summer season becomes high for example, the temperature of the air in the ventilation space 175 that covers the battery pack 110 can also become high. Even in that case, the high voltage battery 111 of the battery pack 110 covered by the ventilation space 175 can be cooled, by supplying the air of the lower temperature than the temperature of the high voltage battery 111 to the ventilation space 175.

Also, the ventilation space 175 is positioned between the battery pack 110 and the vehicle compartment 17 in the high temperature state. This reduces the amount of heat that flows into the battery pack 110 from the vehicle compartment 17 side, by supplying the air of the lower temperature than the temperature of the high voltage battery 111 to the ventilation space 175. This reduces a rise of the temperature of the high voltage battery 111 of the battery pack 110 due to the heat that flows into the battery pack 110 from the vehicle compartment 17 side. Thus, the degradation of the high voltage battery 111 can be prevented.

The blow controller 275a may control the driving of the cooling fan 190, in the state in which the high voltage battery 111 is chargeable by the power supply outside the vehicle 1. Specifically, the blow controller 275a may control the driving of the cooling fan 190, when the vehicle 1 is in the plug-in state. Thereby, in the state in which the cooling fan 190 is driven, the electricity accumulated in the high voltage battery 111 supplied to the low voltage battery 150 can be charged by the power supply outside the vehicle 1. Thus, the electricity accumulated in the high voltage battery 111 is prevented from being consumed completely by the driving of the cooling fan 190 at the time of parking. This prevents a state of a low charging rate of the high voltage battery 111 at the time of starting the driving of the vehicle 1, after the high voltage battery 111 is cooled by the cooling fan 190 while the vehicle is parked.

The blow controller 275a may drive the cooling fan 190, when the temperature determiner 273 determines that the air temperature of the outside of the vehicle 1 is lower than the temperature of the high voltage battery 111 and the temperature of the high voltage battery 111 is higher than a first temperature. Here, the first temperature is a temperature at which battery performance such as the charging efficiency and the output of the high voltage battery 111 significantly decreases in a temperature range lower than the first temperature, and is set at 0° C., for example. The blow controller 275a acquires a set value of the first temperature stored in the storage 271, and determines whether or not the temperature of the high voltage battery 111 is higher than the first temperature. Thereby, the driving of the cooling fan 190 can be stopped, when the temperature of the high voltage battery 111 is lower than the first temperature. This prevents the temperature of the high voltage battery 111 from being cooled to the temperature at which the battery performance such as the charging efficiency and the output of the high voltage battery 111 significantly decreases.

The blow controller 275a may stop the driving of the cooling fan 190, after the air outside the vehicle 1 is blown to the ventilation space 175 by the cooling fan 190 continuously for a first time. Here, the first time is set at a time sufficient for ventilating the ventilation space 175 by performing the blowing by the cooling fan 190 continuously for the first time, for example. The blow controller 275a acquires a set value of the first time stored in the storage 271, and determines whether or not the air outside the vehicle 1 is blown to the ventilation space 175 by the cooling fan 190 continuously for the first time. This reduces the summation value of the time for driving the cooling fan 190, as compared with a case in which the cooling fan 190 is driven continuously until the plug-in state of the vehicle 1 is disengaged after the driving of the cooling fan 190 is started, for example. Thus, the electricity consumed by the driving of the cooling fan 190 can be reduced.

The charge controller 275b controls the charging of the high voltage battery 111. For example, the charge controller 275b controls the charging of the high voltage battery 111, by instructing the operation to the controller (not depicted) that controls the operation of the battery pack 110.

The charge controller 275b may start the charging of the high voltage battery 111, after a second time elapses from the time point at which the high voltage battery 111 becomes chargeable by the power supply outside the vehicle 1. Specifically, the charge controller 275b may start the charging of the high voltage battery 111, after the second time elapses from the time point at which the vehicle 1 becomes the plug-in state. Here, the second time is set at a time sufficient to cool the high voltage battery 111 to a temperature at which the degradation of the high voltage battery 111 is prevented, by performing the blowing by the cooling fan 190 continuously for the second time, for example. The charge controller 275b acquires the set value of the second time stored in the storage 271, and determines whether or not the second time has elapsed from the time point at which the high voltage battery 111 becomes chargeable by the power supply outside the vehicle 1.

This decreases the temperature of the high voltage battery 111 at the time point when the charging of the high voltage battery 111 is started, even when the temperature of the high voltage battery 111 at the time point when the vehicle 1 becomes the plug-in state is high enough to hasten the degradation of the high voltage battery 111. This prevents the temperature of the high voltage battery 111 from becoming a high temperature state enough to hasten the degradation of the high voltage battery 111, by the temperature rise of the high voltage battery 111 associated with the charging of the high voltage battery 111.

When the temperature of the high voltage battery 111 is lower than a second temperature, the charge controller 275b may start the charging of the high voltage battery 111. Here, the second temperature can be set at a temperature at which the degradation of the high voltage battery 111 is prevented, for example. The charge controller 275b acquires a set value of the second temperature stored in the storage 271, and determines whether or not the temperature of the high voltage battery 111 is lower than the second temperature.

This decreases more accurately the temperature of the high voltage battery 111 at the time point when the charging of the high voltage battery 111 is started. This prevents more accurately the temperature of the high voltage battery 111 from becoming a high temperature state enough to hasten the degradation of the high voltage battery 111, by the temperature rise of the high voltage battery 111 associated with the charging of the high voltage battery 111.

2-4. Sequence of Process Executed by Control Device

In the preceding section, the function and configuration of the control device 270 according to the present implementation has been described. Next, the sequence of the process executed by the control device 270 according to the present implementation will be described, with reference to FIGS. 6 to 8.

(2-4-1. Blowing Process)

Figure 6:
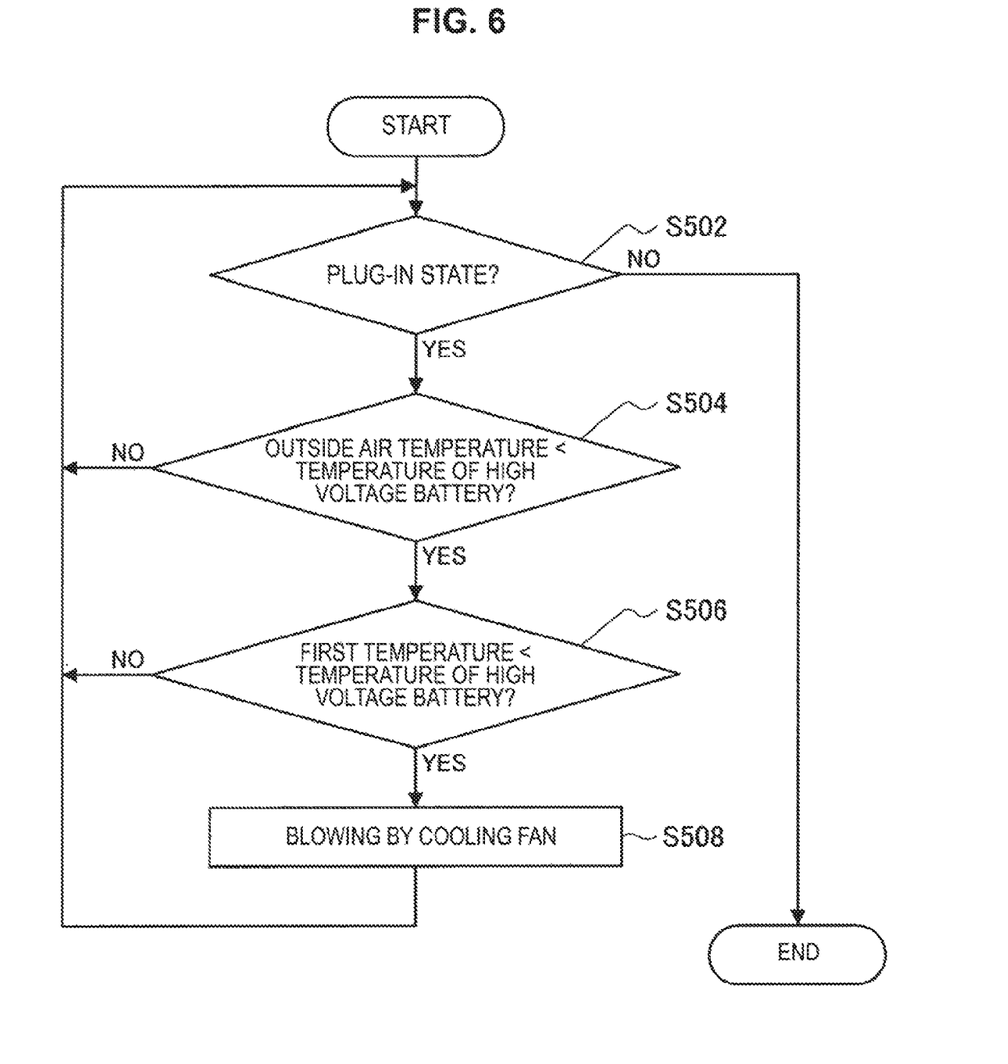
FIG. 6 is a flowchart illustrating an example of a sequence of a blowing process executed by a control device according to the same implementation.

First, with reference to FIG. 6, the sequence of the blowing process executed by the control device 270 will be described. FIG. 6 is a flowchart illustrating an example of the sequence of the blowing process executed by the control device 270 according to the present implementation. First, the control device 270 determines whether or not the vehicle 1 is in the plug-in state, on the basis of the detection result output from the plug-in sensor 230 (step S502). If the control device 270 determines that the vehicle 1 is not in the plug-in state (step S502/NO), the process illustrated in FIG. 6 ends. On the other hand, if the control device 270 determines that the vehicle 1 is in the plug-in state (step S502/YES), the temperature determiner 273 determines whether or not the air temperature of the outside of the vehicle 1 is lower than the temperature of the high voltage battery 111 (step S504).

In step S504, if the temperature determiner 273 determines that the air temperature of the outside of the vehicle 1 is not lower than the temperature of the high voltage battery 111 (step S504/NO), the process returns to step S502, and the determination of the plug-in state is performed. Here, when the air temperature of the outside of the vehicle 1 is not lower than the temperature of the high voltage battery 111, the air outside the vehicle 1 is not blown to the ventilation space 175, because the temperature of the high voltage battery 111 rises unintentionally by blowing the air outside the vehicle 1 to the ventilation space 175. On the other hand, if the temperature determiner 273 determines that the air temperature of the outside of the vehicle 1 is lower than the temperature of the high voltage battery 111 (step S504/YES), the blow controller 275a determines whether or not the temperature of the high voltage battery 111 is higher than the first temperature (step S506).

If the blow controller 275a determines that the temperature of the high voltage battery 111 is not higher than the first temperature (step S506/NO), the process returns to step S502, and the determination of the plug-in state is performed. Here, when the temperature of the high voltage battery 111 is not higher than the first temperature, the air outside the vehicle 1 is not blown to the ventilation space 175, because the temperature of the high voltage battery 111 can be cooled to a temperature at which the battery performance such as the charging efficiency and the output of the high voltage battery 111 is significantly decreased by blowing the air outside the vehicle 1 to the ventilation space 175. On the other hand, if the blow controller 275a determines that the temperature of the high voltage battery 111 is higher than the first temperature (step S506/YES), the blow controller 275a drives the cooling fan 190, and causes the cooling fan 190 to blow the air outside the vehicle 1 to the ventilation space 175 (step S508). Then, the process returns to step S502, and the determination of the plug-in state is performed.

Note that the blow controller 275a may stop the driving of the cooling fan 190, after driving the cooling fan 190 continuously for a first time, in step S508. Also, a series of the determination process from step S502 to step S506 may be performed at all times, and may be performed each time a predetermined time elapses.

(2-4-2. First Example of Sequence of Charge Start Process)

Figure 7:
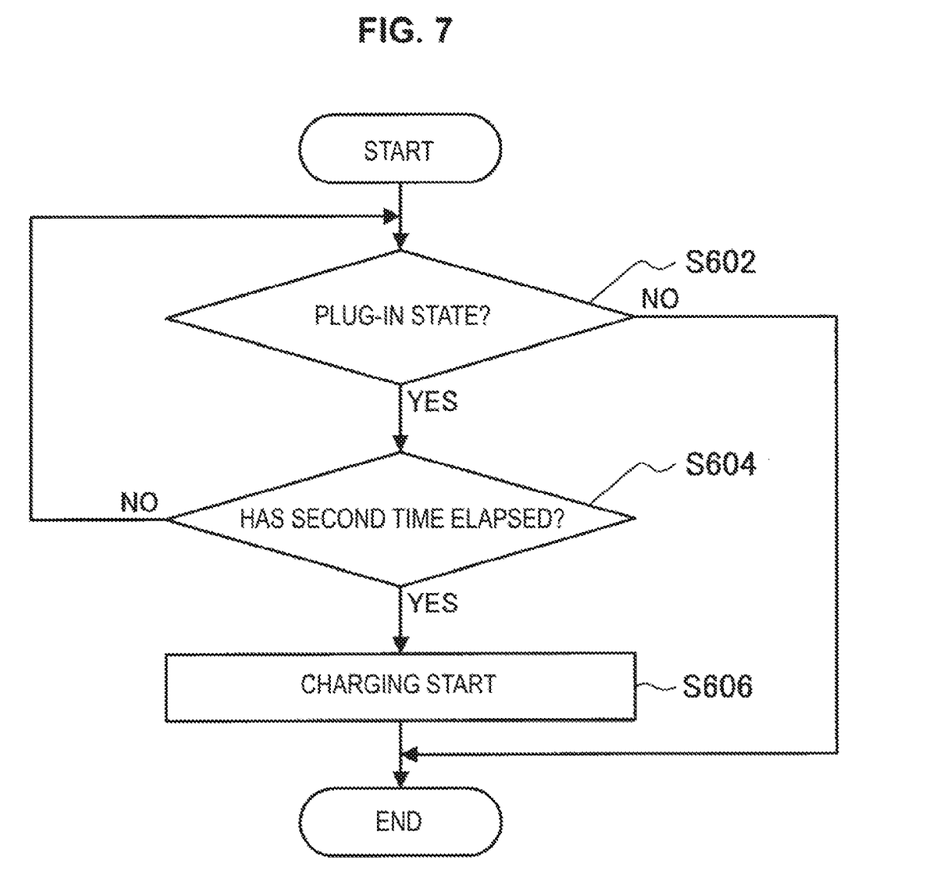
FIG. 7 is a flowchart illustrating a first example of a sequence of a charge start process executed by a control device according to the same implementation.

Next, the sequence of the charge start process executed by the control device 270 will be described, with reference to FIGS. 7 and 8. FIG. 7 is a flowchart illustrating the first example of the sequence of the charge start process executed by the control device 270 according to the present implementation. First, the control device 270 determines whether or not the vehicle 1 is in the plug-in state, on the basis of the detection result output from the plug-in sensor 230 (step S602). If the control device 270 determines that the vehicle 1 is not in the plug-in state (step S602/NO), the process illustrated in FIG. 7 ends. On the other hand, if the control device 270 determines that the vehicle 1 is in the plug-in state (step S602/YES), the charge controller 275b determines whether or not the second time has elapsed from the time point at which the vehicle 1 becomes the plug-in state (step S604).

If the charge controller 275b determines that the second time has not elapsed from the time point at which the vehicle 1 becomes the plug-in state (step S604/NO), the process returns to step S602, and the determination of the plug-in state is performed. Here, when the second time has not elapsed from the time point at which the vehicle 1 becomes the plug-in state, the charging of the high voltage battery 111 is not started, because it is possible that the high voltage battery 111 is not cooled to the temperature at which the degradation of the high voltage battery 111 is prevented. On the other hand, if the charge controller 275b determines that the second time has elapsed from the time point at which the vehicle 1 becomes the plug-in state (step S604/YES), the charge controller 275b starts the charging of the high voltage battery 111 (step S606). Then, the process illustrated in FIG. 7 ends.

(2-4-3. Second Example of Sequence of Charge Start Process)

Figure 8:
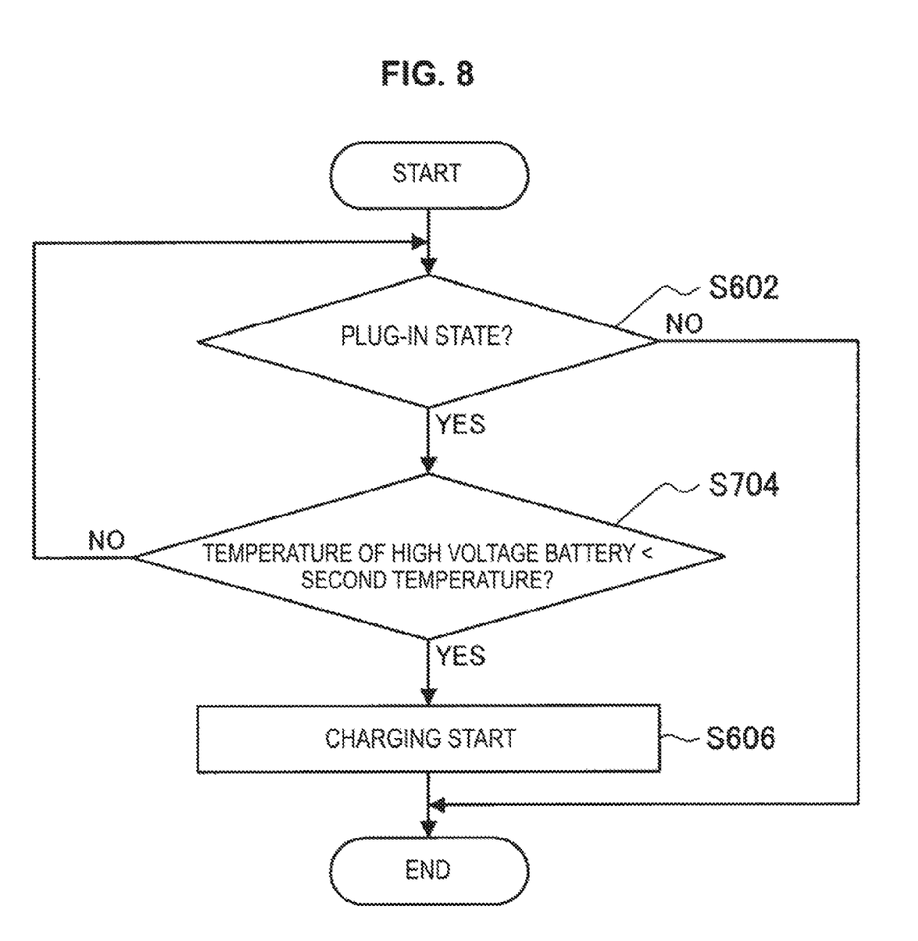
FIG. 8 is a flowchart illustrating a second example of a sequence of a charge start process executed by a control device according to the same implementation.

FIG. 8 is a flowchart illustrating a second example of the sequence of the charge start process executed by the control device 270 according to the present implementation. In the second example of the sequence of the charge start process illustrated in FIG. 8, the determination process before the process (step S606) for starting the charging of the high voltage battery 111 is different, as compared with the process illustrated in FIG. 7. Specifically, in the second example of the sequence of the charge start process illustrated in FIG. 8, if the control device 270 determines that the vehicle 1 is in the plug-in state (step S602/YES), the charge controller 275b determines whether or not the temperature of the high voltage battery 111 is lower than the second temperature (step S704).

If the charge controller 275b determines that the temperature of the high voltage battery 111 is not lower than the second temperature (step S704/NO), the process returns to step S602, and the determination of the plug-in state is performed. Here, if the temperature of the high voltage battery 111 is not lower than the second temperature, the charging of the high voltage battery 111 is not started, because it is possible that the high voltage battery 111 is not cooled to the temperature at which the degradation of the high voltage battery 111 is prevented. On the other hand, if the charge controller 275b determines that the temperature of the high voltage battery 111 is lower than the second temperature (step S704/YES), the charge controller 275b starts the charging of the high voltage battery 111 (step S606). Then, the process illustrated in FIG. 8 ends.

3. Effect

According to the above implementation, the rear part 13 of the floor pan and the luggage compartment deck board 15 are utilized as the housing 170 that houses the battery pack 110 including the high voltage battery 111 and the case 113 that covers the high voltage battery 111, for example. The cooling fan 190 blows the air outside the vehicle 1 into the housing 170. The temperature determiner 273 determines whether or not the air temperature of the outside of the vehicle 1 is lower than the temperature of the high voltage battery 111. The blow controller 275a drives the cooling fan 190, when the temperature determiner 273 determines that the air temperature of the outside of the vehicle 1 is lower than the temperature of the high voltage battery 111. Thereby, the air of the lower temperature than the temperature of the high voltage battery 111 can be supplied to the ventilation space 175 of the housing 170 from the outside of the vehicle 1. When the temperature of the air in the vehicle compartment 17 at the time of parking under the direct sunlight of the summer season becomes high for example, the temperature of the air in the ventilation space 175 that covers the battery pack 110 can also become high. Even in that case, the high voltage battery 111 of the battery pack 110 covered by the ventilation space 175 can be cooled, by supplying the air of the lower temperature than the temperature of the high voltage battery 111 to the ventilation space 175.

Also, the ventilation space 175 is positioned between the battery pack 110 and the vehicle compartment 17 in the high temperature state. This reduces the amount of the heat that flows into the battery pack 110 from the vehicle compartment 17 side, by supplying the air of the lower temperature than the temperature of the high voltage battery 111 to the ventilation space 175. This reduces a rise of the temperature of the high voltage battery 111 of the battery pack 110 due to the heat that flows into the battery pack 110 from the vehicle compartment 17 side. Thus, the degradation of the high voltage battery 111 can be prevented.

Also, according to the implementation described above, the blow controller 275a controls the driving of the cooling fan 190, in the state in which the high voltage battery 111 is chargeable by the power supply outside the vehicle 1. Thereby, in the state in which the cooling fan 190 is driven, the electricity accumulated in the high voltage battery 111 supplied to the low voltage battery 150 can be charged by the power supply outside the vehicle 1. Thus, the electricity accumulated in the high voltage battery 111 is prevented from being consumed completely by the driving of the cooling fan 190 at the time of parking. This prevents a state of a low charging rate of the high voltage battery 111 at the time of starting the driving of the vehicle 1 after the high voltage battery 111 is cooled by the cooling fan 190 while the vehicle is parked.

Also, according to the implementation described above, the high voltage battery 111 is an electricity supply source of a high voltage. The cooling fan 190 blows the air outside the vehicle 1 to the high voltage battery 111, by using the electricity of the low voltage battery 150 which is the electricity supply source of the lower voltage than the high voltage battery 111. Also, the electricity is supplied from the high voltage battery 111 to the low voltage battery 150, in the state in which the cooling fan 190 is driven. Thereby, the low voltage battery 150 can be charged at the time of driving of the cooling fan 190 in which the electricity accumulated in the low voltage battery 150 is consumed. Thus, the driving of the cooling fan 190 can be continued, without completely consuming the electricity accumulated in the low voltage battery 150.

4. Conclusion

As described above, according to the present implementation, the housing that houses the battery pack including the secondary battery and the case that covers the secondary battery is provided in the vehicle. The air of the outside of the vehicle is blown into the housing. It is determined whether or not the air temperature of the outside of the vehicle is lower than the temperature of the secondary battery. When it is determined that the air temperature of the outside of the vehicle is lower than the temperature of the secondary battery, the air of the outside of the vehicle is blown into the housing. Thereby, the air of the lower temperature than the temperature of the secondary battery can be supplied from the outside of the vehicle into the housing. When the temperature of the vehicle compartment air at the time of parking under the direct sunlight of the summer season becomes high for example, the temperature of the air in the housing that covers the battery pack can also become high. Even in that case, the secondary battery of the battery pack covered by the space in the housing can be cooled, by supplying the air of the lower temperature than the temperature of the secondary battery into the housing.

Also, the space in the housing is positioned between the battery pack and the vehicle compartment in the high temperature state. This reduces the amount of the heat that flows into the battery pack from the vehicle compartment side, by supplying to the space the air of the lower temperature than the temperature of the secondary battery. This prevents the temperature of the secondary battery of the battery pack from rising due to the heat that flows into the battery pack from the vehicle compartment side. Thus, the degradation of the secondary battery can be prevented.

Although, in the example described above, the cooling fan 190 is driven in the state in which the high voltage battery 111 is chargeable by the power supply outside the vehicle 1, the technical scope of the present invention is not limited to such an example. For example, when an electricity generation device such as solar cell is provided in the vehicle 1, the cooling fan 190 may be driven in the state in which the high voltage battery 111 is chargeable by the electricity generation device.

Also, in the plug-in state, when the time for performing the charging of the high voltage battery 111 is managed by the external charge device 3, the cooling device 10 may control the driving of the cooling fan 190 on the basis of whether or not the current time point is within the time period to perform the charging of the high voltage battery 111. For example, the cooling device 10 drives the cooling fan 190, when it is determined that the current time point is within the time period to perform the charging of the high voltage battery 111. Thereby, the electricity accumulated in the high voltage battery 111 is prevented from being consumed completely by the driving of the cooling fan 190 at the time of parking of the vehicle 1.

Also, the electricity may be supplied directly to the DC-DC converter 130 from the external charge device 3, and may be supplied to the cooling fan 190 after the electricity is reduced in voltage by the DC-DC converter 130. In that case, the cooling fan 190 may blow the air outside the vehicle 1 to the ventilation space 175, by using the electricity supplied from the external charge device 3 via the DC-DC converter 130.

Also, the process described by using the flowchart in the present specification is needless to be executed in the order illustrated in the flowchart necessarily. Several process steps may be parallelly executed. Also, an additional process step may be employed, and a part of process step may be omitted.

Figure 9:
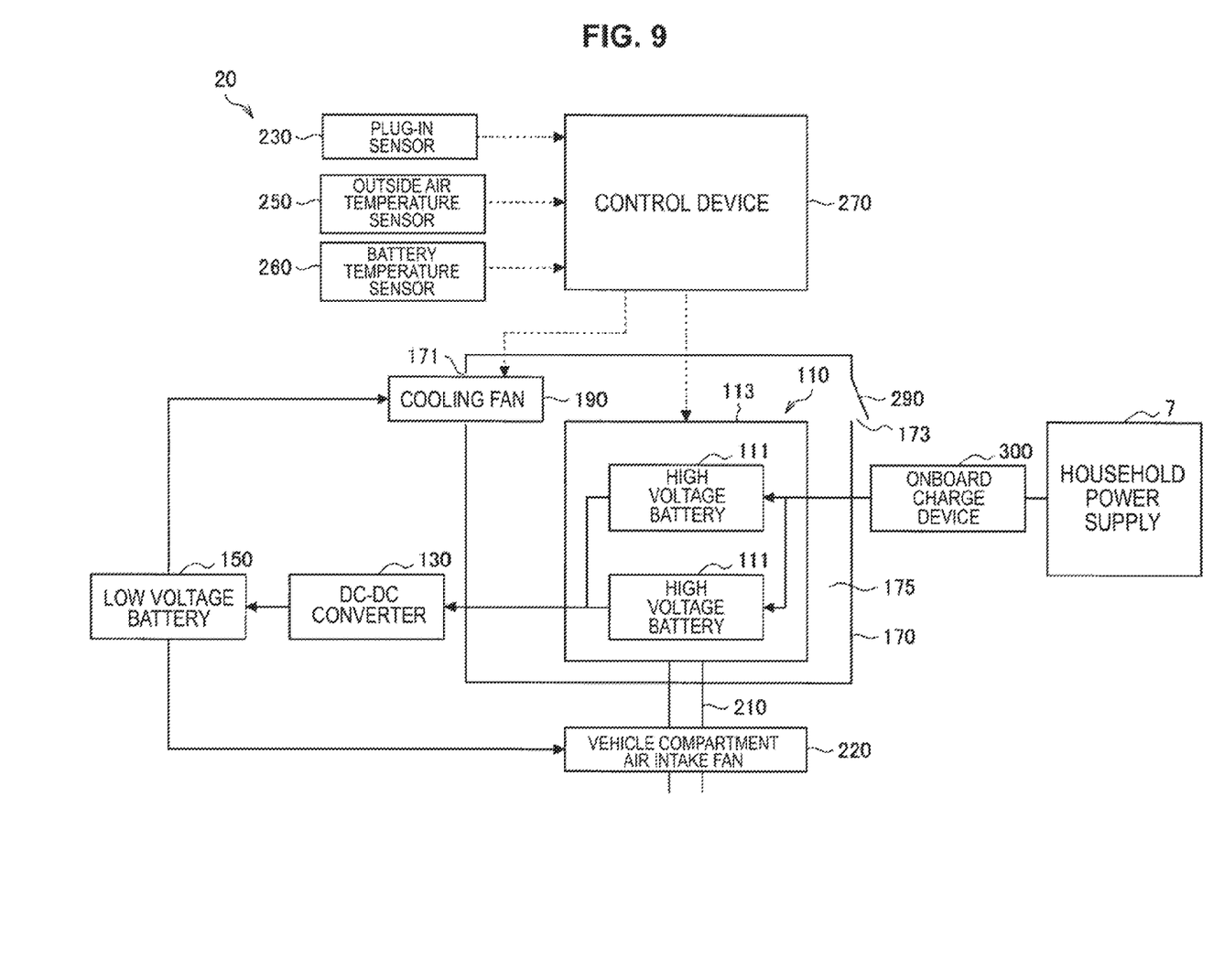
FIG. 9 illustrates a schematic configuration of an example of a cooling device according to an exemplary variant.

Also, although, in the example described above, the electricity is supplied directly to the high voltage battery 111 from the external charge device 3 in order to charge the high voltage battery 111, the technical scope of the present invention is not limited to such an example. For example, the high voltage battery 111 may be charged by using a household power supply (for example, direct current 100V). FIG. 9 illustrates a schematic configuration of an example of the cooling device 20 according to an exemplary variant. As illustrated in FIG. 9, the cooling device 20 according to the exemplary variant includes an onboard charge device 300, as opposed to the cooling device 10 according to the above implementation. The vehicle 1 and the household power supply 7 are coupled via a cable, to enable the supply of the electricity to the vehicle 1 from the household power supply 7. In the exemplary variant, the onboard charge device 300 converts the electricity supplied from the household power supply 7, from direct current 100V to alternate current 200V. The electricity converted by the onboard charge device 300 is supplied to the high voltage battery 111. Note that the electricity supplied from the household power supply 7 may be direct current 200V, direct current 120V, direct current 240V, in addition to direct current 100V, and the onboard charge device 300 can convert the electricity supplied from the household power supply 7 to the electricity corresponding to the high voltage battery 111. In the exemplary variant, the household power supply 7 can correspond to the power supply outside the vehicle according to the implementation of the present invention. Thus, the vehicle 1 and the household power supply 7 are coupled via the cable, in order to make the high voltage battery 111 chargeable by the power supply outside the vehicle 1.

Although the preferred implementations of the present invention have been described in detail with reference to the appended drawings, the present invention is not limited thereto. It is obvious to those skilled in the art that various modifications or variations are possible insofar as they are within the technical scope of the appended claims or the equivalents thereof. It should be understood that such modifications or variations are also within the technical scope of the present invention.

The invention claimed is:

1. A cooling device, comprising:
    a housing in a vehicle, wherein the housing includes a battery pack, and wherein the battery pack includes a secondary battery that has a first voltage and a case that covers the secondary battery;
    a blower that blows air from outside of the vehicle into the housing;
    a temperature determiner that determines that an air temperature outside the vehicle is lower than a temperature of the secondary battery;
    a blow controller that drives the blower based on the determination that the air temperature outside the vehicle is lower than the temperature of the secondary battery; and an electricity supply source that has a second voltage lower than the first voltage, wherein the electricity supply source receives a supply of electricity from the secondary battery in a state in which the blower is driven by the electricity supply source at a time of parking of the vehicle.

2. The cooling device according to claim 1, wherein the blow controller controls a driving of the blower, in a state in which the secondary battery is chargeable by a power supply outside the vehicle.

3. The cooling device according to claim 1, wherein the secondary battery is a supply source of the first voltage, and
the blower blows the air from the outside of the vehicle into the housing, based on electricity of the electricity supply source of the second voltage lower than the first voltage of the secondary battery.

4. The cooling device according to claim 1, wherein the blow controller drives the blower, when the temperature determiner determines that the air temperature of the outside of the vehicle is lower than the temperature of the secondary battery and that the temperature of the secondary battery is higher than a first temperature.

5. The cooling device according to claim 2, wherein the blow controller drives the blower, when the temperature determiner determines that the air temperature of the outside of the vehicle is lower than the temperature of the secondary battery and that the temperature of the secondary battery is higher than a first temperature.

6. The cooling device according to claim 3, wherein the blow controller drives the blower, when the temperature determiner determines that the air temperature of the outside of the vehicle is lower than the temperature of the secondary battery and that the temperature of the secondary battery is higher than a first temperature.

7. The cooling device according to claim 1, wherein the blow controller stops the blower after a set time for which the blower continuously blows the air into the housing.

8. The cooling device according to claim 3, wherein the blow controller stops the blower after a set time for which the blower continuously blows the air into the housing.

9. The cooling device according to claim 2, further comprising:
a charge controller that controls a charging of the secondary battery,
wherein the charge controller starts the charging of the secondary battery, after a second time elapses from a time point at which the secondary battery becomes chargeable by the power supply outside the vehicle.

10. The cooling device according to claim 3, further comprising:
a charge controller that controls a charging of the secondary battery,
wherein the charge controller starts the charging of the secondary battery, after a second time elapses from a time point at which the secondary battery becomes chargeable by the power supply outside the vehicle.

11. The cooling device according to claim 1, further comprising:
a charge controller that controls a charging of the secondary battery,
wherein the charge controller starts the charging of the secondary battery, when the temperature of the secondary battery is lower than a second temperature.

12. The cooling device according to claim 2, further comprising:
a charge controller that controls a charging of the secondary battery,
wherein the charge controller starts the charging of the secondary battery, when the temperature of the secondary battery is lower than a second temperature.

13. The cooling device according to claim 3, further comprising:
a charge controller that controls a charging of the secondary battery,
wherein the charge controller starts the charging of the secondary battery, when the temperature of the secondary battery is lower than a second temperature.

14. The cooling device according to claim 1, wherein the housing further comprises a component that is positioned at a vehicle compartment side of the vehicle, and wherein the component has a heat insulation property.

15. The cooling device according to claim 3, wherein the housing further comprises a component that is positioned at a vehicle compartment side of the vehicle, and wherein the component has a heat insulation property.

16. The cooling device according to claim 1, wherein the secondary battery is configured to receives charge from a power supply outside the vehicle in the state in which the blower is driven.

17. The cooling device according to claim 1, further comprising a converter that reduces the first voltage of the secondary battery before the supply of the electricity from the secondary battery to the electricity supply source.

18. The cooling device according to claim 17, wherein the secondary battery charges the electricity supply source based on the reduced first voltage.

19. The cooling device according to claim 1, wherein the blower is present in an opening of the housing, and wherein the blower further blows the air outside the vehicle into the housing through the opening.

20. The cooling device according to claim 1, wherein the housing comprises a valve, and wherein the valve opens based on a pressure of an inner area of the housing.

* * * * *